United States Patent [19]

Nakamura et al.

[11] 4,138,601
[45] Feb. 6, 1979

[54] SAFETY DEVICE

[75] Inventors: Toshiaki Nakamura; Hiroshi Sasaki, both of Iwata, Japan

[73] Assignee: Yamaha Hatsudoki Kabushiki Kaisha, Iwata, Japan

[21] Appl. No.: 740,786

[22] Filed: Nov. 11, 1976

[30] Foreign Application Priority Data

Nov. 21, 1975 [JP] Japan .............................. 50-158203[U]

[51] Int. Cl.² .......................... H01H 9/06; F02B 77/00
[52] U.S. Cl. ............................ 200/61.85; 123/198 DB; 123/198 DC; 200/61.89; 200/157
[58] Field of Search ...................... 200/61.58 R, 61.85, 200/61.86, 61.87, 61.88, 61.89, 161, 157; 74/469, 470, 479, 491; 123/108, 98, 198 B, 198 D, 198 DB, 198 DC; 180/82 R, 103 R, 103 BF

[56] References Cited

U.S. PATENT DOCUMENTS

| | | | |
|---|---|---|---|
| 3,322,912 | 5/1967 | Kuchta | 200/61.89 X |
| 3,672,344 | 6/1972 | Albertson | 123/198 DB |
| 3,688,599 | 9/1972 | St. Germain | 200/61.85 X |
| 3,694,596 | 9/1972 | Carlson | 200/61.87 |
| 3,734,230 | 5/1973 | Tanaka | 200/61.85 X |
| 3,742,928 | 7/1973 | Albertson | 200/61.86 X |
| 3,758,736 | 9/1973 | Tanaka | 200/61.85 X |
| 3,789,938 | 2/1974 | Hetteen | 123/198 DB X |
| 3,798,402 | 3/1974 | Raab | 200/61.85 X |
| 3,845,847 | 11/1974 | Camp | 200/61.87 X |
| 4,058,105 | 11/1977 | Schellin et al. | 123/198 DC |

FOREIGN PATENT DOCUMENTS 978816 12/1975 Canada .............................. 123/198 DC Primary Examiner—James R. Scott
Attorney, Agent, or Firm—Donald D. Mon

[57] ABSTRACT

A safety device to stop an engine when the throttle position and the throttle lever position are sufficienty out of synchronism to indicate malfunction. The device includes a pivot means, a throttle lever, and a throttle operating member rotatably supported on said pivot means. Lever bias means biases the throttle lever in a first rotational direction. Bias means effective on the throttle valve biases the throttle operating member in the same direction. Both bias means can be overcome by a sufficient force on the throttle lever. The throttle lever and throttle operating member are abuttable so that they can be rotated in a second direction. They are separable in order that the throttle lever may move away from the throttle operating member if the latter is restrained against movement in response to its bias force. A first and a second switch member are rotatably supported for concentric rotation, one switch member being connected to the throttle lever and the other to the throttle operating member. Switching means has a conductive and a non-conductive condition determined by the relative rotational position of the two members, whereby the switching condition can be changed when the relative positions of the throttle lever and the throttle operating member are out of synchronism.

10 Claims, 5 Drawing Figures

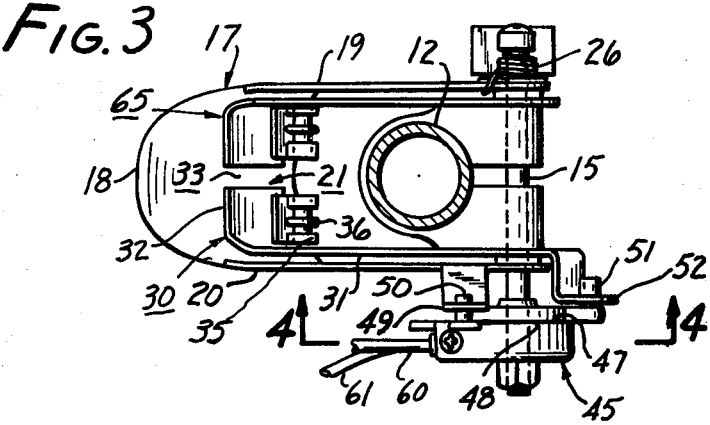
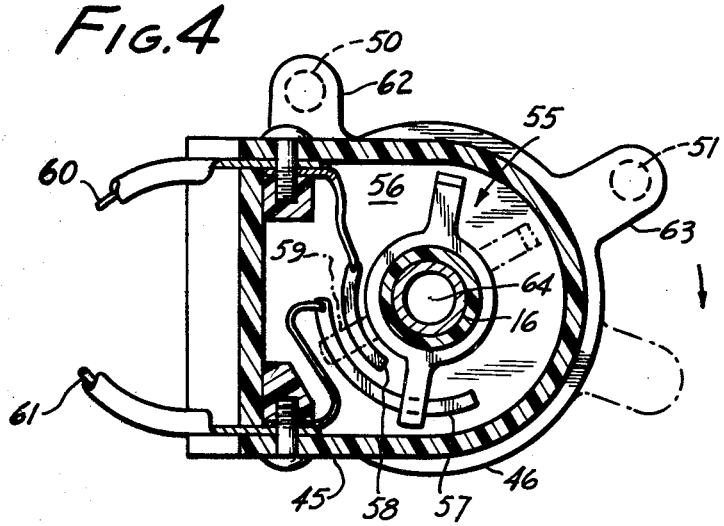
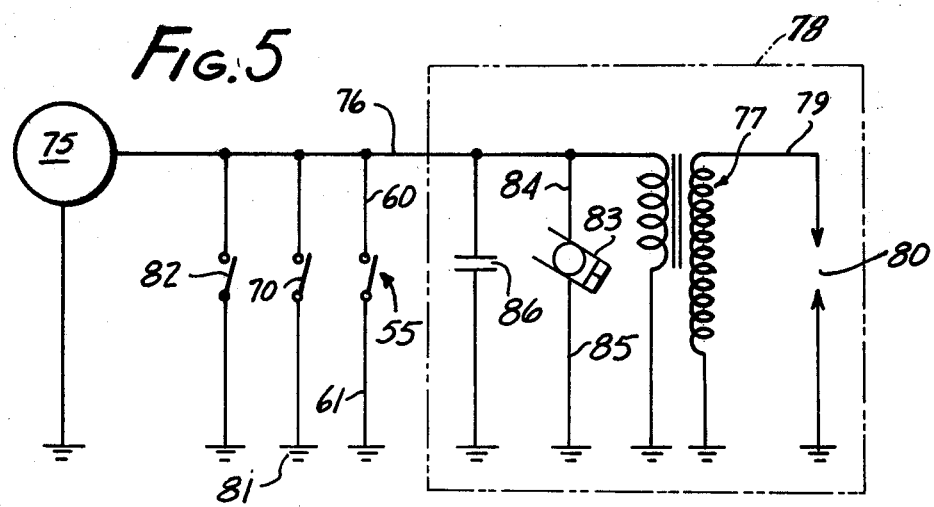

SAFETY DEVICE

BACKGROUND OF THE INVENTION FIELD OF INVENTION

This invention relates to a safety device, and in particular to a safety device responsive to the relative rotational position of two rotatable members.

Especially in vehicles such as snowmobiles, the risk exists that a throttle valve may become stuck open, so that when the throttle lever is released, the throttle valve does not close. This is potentially dangerous, because the vehicle would then not stop. One place where such a situation can occur is in a snowmobile engine, wherein water might get into the throttle linkage and freeze, whereby to hold the throttle valve open, even though the throttle lever is released.

It is an object of this invention to provide a safety device which will stop the engine if the throttle valve itself remains open but the throttle lever returns to a position where the throttle should have closed. The throttle valve and throttle lever are then said to be "out of synchronism". Immobilization of the throttle valve as a consequence of ice in the linkage, is only one example of disabling situations which tend to hold a linkage in an out-of-synchronism position. Mechanical damage to the linkage could also cause such a condition.

DESCRIPTION OF THE PRIOR ART

The prior art includes at least one previous attempt to provide a safety device with the proposed function. In this previous device, which is shown in Japanese patent publication filed Dec. 17, 1970, published Feb. 28, 1974, under No. Sho 45-114,378 (see the respective U.S. Pat. No. 3,734,230, issued May 22, 1973), a short-circuiting piece is secured to the end of a throttle wire coupled to a throttle lever, whereby, if the throttle wires becomes immovable, the short-circuiting piece will contact a returning throttle lever to short-circuit an ignition system for the engine, thereby stopping the engine. However, this prior art attempt had serious shortcomings because slits had to be provided to allow movement of an end portion of the throttle valve relative to the throttle lever so that water could enter into the switch and cause failure or malfunctioning of the safety feature itself.

It is an object of the instant invention to provide a compact safety device with switching means which can readily be protected from the weather and whose operation affords more certainty of operation than the prior art.

SUMMARY OF THE INVENTION

A safety device according to this invention includes pivot means, and a throttle lever and a throttle operating member both independently rotatably supported on the pivot means. Lever bias means biases the throttle lever in a first rotational direction, the throttle operating member being adatped for connection to a spring biased throttle valve with a throttle bias which tends to move the throttle operating member also in the first direction. Both of these bias means can be overcome by a sufficient force exerted on the lever. The throttle lever is adapted to abut on the throttle operating member to press it in the second direction. The lever is adapted to move away from the throttle operating member in the first direction should the throttle operating member be restrained against such movement.

A first switch member and a second switch member are rotatably supported for concentric rotation independently of one another. On switch member is connected to the throttle member, and the other switch member is connected to the throttle operating member, whereby each is rotatable with its respective throttle lever or throttle operating member. Switching means having a conductive and a non-conductive condition is provided, whose condition is determined by the relative rotational position of the two members.

According to a preferred but optional feature of the invention, the switching means includes a pair of contacts on one of said switch members, and a contactor adapted to bridge or not to bridge the contacts carried by the other of said switch members.

The above and other features of this invention will be fully understood from the following detailed description and the accompanying drawings, in which:

FIG. 3 is a cross-section taken at line 3—3 of FIG. 1;

FIG. 4 is a cross-section taken at line 4—4 of FIG. 3; and

FIG. 5 is a schematic circuit diagram showing the invention installed in a system.

DESCRIPTION OF THE PREFERRED EMBODIMENT

Figure 1:
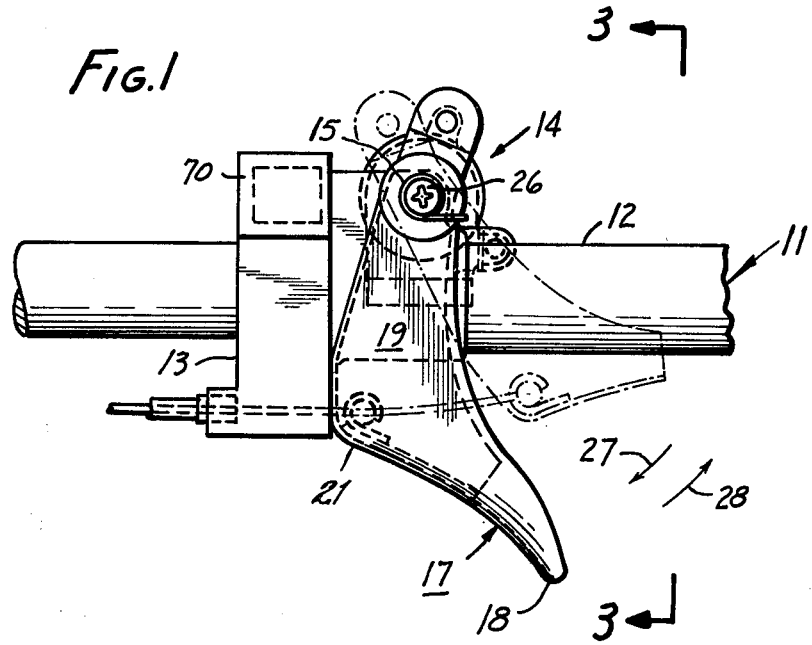
FIG. 1 is a side elevation showing the presently preferred embodiment of the invention.

In FIG. 1 there is shown a steering handle 11 of a vehicle, such as a snowmobile. A snowmobile is one example of a vehicle utilizing a spark ignition-type engine for which a safety shut-off for the engine is desirable. A grip 12 is provided near the tip portion of the steering handle, and an attachment member 13, such as a clamp, is secured to the steering handle adjacent to the grip.

Safety device 14 is held to the steering handle by the attachment member. The safety device includes a pivot means 15 in the form of a cylindrical pin 16. A throttle lever 17 (sometimes called a lever) is rotatably mounted to the pivot. The throttle lever is conveniently made by bending a metal piece into a "U" shape. The bight 21 of the throttle lever is formed with an extension 18 for engagement by the finger of the driver. Legs 19, 20 of the throttle lever are apertured to pass and rotate upon pin 16.

First bias means 25 is provided in the form of a clothes-pin-type torsion spring 26 which tends to rotate the lever in a first rotational direction 27 (clockwise in FIG. 1). The bias of spring 26 can be overcome by a sufficient counter-rotative force exerted on extension 18, whereby to move the throttle lever in a second, opposite, rotational direction 28. It will thereby be seen that the throttle lever forms a channeled shroud which protects mechanism within it, which is free to rotate around pin 16, and which is biased in the clockwise direction of FIG. 1. Its motion in the first direction is limited by its abutment against attachment member 13.

Figure 2:
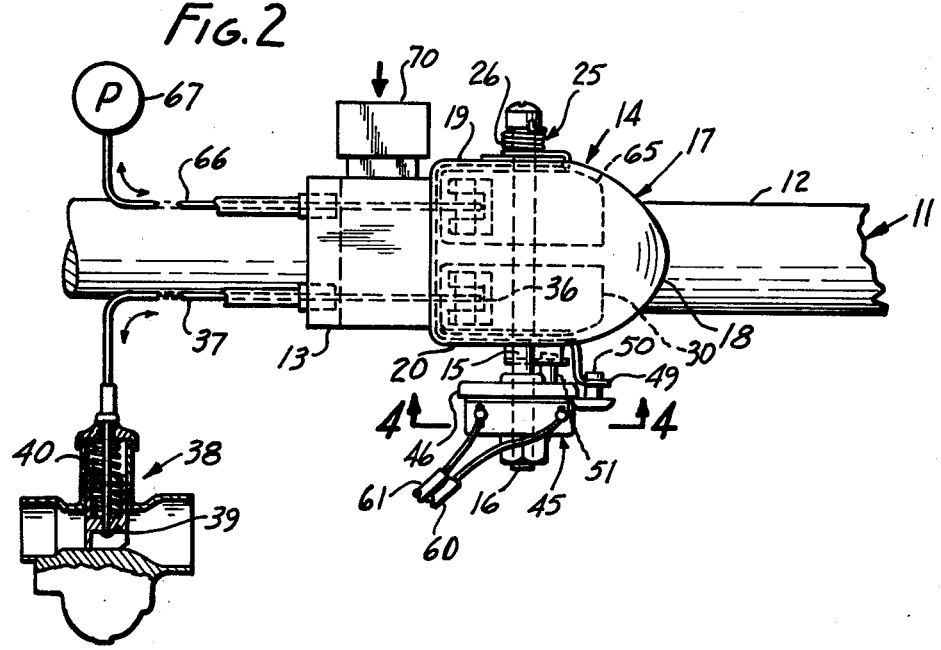
FIG. 2 is a bottom view of FIG. 1.

A throttle operating member 30 (sometimes called an operating member) is placed inside the bight of the throttle lever, between legs 19 and 20. It includes a leg 31 which is apertured to pass and rotate around pin 16 so that member 30 is freely pivotable around the pivot means. It includes an abutment flange 32 which faces toward the undersurface 33 of bight 21 of the throttle lever. Connector means 35 is attached to flange 31 to receive the end 36 of a throttle linkage 37, such as a throttle cable. The throttle linkage passes through a slit (not shown) in the bight of the throttle lever and thence through the attachment member to a carburetor 38 having a throttle valve 39 which is biased toward its closed position by spring bias means 40 (sometimes called "second bias means"). This bias means causes movement of the throttle linkage 31 to the left in FIGS. 1 and 2, and can be overcome by a sufficient force exerted on throttle operating member 30 by throttle lever 17. Thus, the throttle operating member is biased in the first rotational direction 27 and tends to approach and abut the throttle lever to be pushed by it in the second direction, and to follow it in the first direction when synchronism is possible.

Should there be any impediment to the free return of the throttle linkage 37, such that the throttle valve will not close and the throttle operating member will not move in the clockwise direction in FIG. 1, the throttle lever can move independently of it, and the positions of the throttle lever and the throttle operating member will be out of synchronism. The throttle valve will remain open, even though the throttle lever has returned to the position which ordinarily would signify that the throttle valve was closed. This is the unsafe condition which it is a purpose of the invention to overcome.

To overcome this unsafe condition there is provided a first switch member 45 and a second switch member 46. First switch member 45 is apertured to pivot freely around the pivot means. It includes a face 47 facing toward the second switch member. A face 48 on the second switch member faces toward face 47. These faces abut directly, or indirectly with a seal between them. Particulate matter and, if desired, liquid, can be excluded from between these surfaces which move in a shear relationship to one another.

The throttle lever has a finger 49 with a hole therein to pass a stud 50 on the first switch member. The stud and the finger comprise attachment means for attaching the first switch member to the throttle lever for rotation. Similarly, the second switch member has a stud 51 which passes through an aperture on a finger 52 on the throttle operating member 30. It will be evident from FIGS. 3 and 4 that when the throttle lever and the throttle operating member rotate together, there is no change in the angular rotational position between the two switch members, and they are said to be in synchronism.

Switching means 55 is carried inside a cavity 56 formed between the two switch members. The switching means can be of any desired configuration which can make a non-conductive condition in one relative angular position of the two switch members and a conductive condition in another. One suitable arrangement is shown in FIG. 4 wherein a pair of contacts 57, 58 of different angular subtense can be bridged by conductive contactor 59 in one angular position shown in dashed line, and does not bridge them in another shown in solid line. In this embodiment, the contacts are carried by the first switch member and the contactor is carried by the second switch member. It is evident that reversal of parts can be provided and also other techniques of using switches can be used instead. Conductive leads 60, 61 depart from the respective contacts 57, 58 to form part of a circuit yet to be described.

As shown in FIG. 4, the studs are mounted on lever-like projections 62, 63 so as to be spaced from the central axis of rotation 64 of the pivot pin.

An oil pump operating member 65 (see FIG. 3), which is similar to the throttle operating member 30, is connected to a linkage 66 that controls an oil pump 67. This is merely a convenient means of being certain that the oil pump operates while the throttle lever is moved to a position such as to run the engine. It does not prevent the throttle lever form returning when released.

A manual kill switch 70 is mounted to the attachment member 13. It is a depressible off-on switch for the purpose of opening or closing a circuit in response to the driver's wishes. In this embodiment, it is a spring-biased, normally open, switch which can be closed.

The function of this device is best shown in FIG. 5. In FIG. 5 a flywheel magneto 75 is shown which, when rotated, provides a pulse for a spark ignition circuit. A primary line 76 is connected to the flywheel magneto and to an ignition coil 77 in an ignition device 78. A secondary line 79 is connected to the secondary side of the ignition coil and is then connected to a spark plug 80. The plug 80 fires when contact breaker 83 opens lines 84, 85. A charge is stored in capacitor 86.

Between the primary line 76 and the ground 81, a main off-on ignition switch 82, switch means 55, and a manual kill switch 70 are connected in parallel. These switches are all normally open, but can be individually closed to prevent or to terminate operation of the engine. When closed, they ground the pulse which would otherwise create the necessary ignition.

In the invention, when the main ignition switch 82 and the manual switch 70 are open, and switch means 55 is also open, the engine will have ignition, an can be operated. The throttle lever may be rotated so as to move the throttle operating member 30 to open the throttle to control the power. With the throttle lever and the throttle operating member in synchronism (solid line), the primary line 76 is not grounded, because the switching condition is open (non-conductive). As a result, in this condition the engine can be started and can continue to run. When the throttle lever is normally operated during the running of the engine, and there is no impediment to the throttle valve or to its linkage, the throttle lever and the throttle operating member rotate together as a pair. They remain in synchronism. In this condition, the two contacts 57 and 58 remain disconnected.

In an emergency situation, such as when the linkage is frozen or the throttle valve is stuck, the engine will not decelerate despite the fact that the throttle lever may have returned to its initial relaxed condition. The throttle lever and the throttle operating member are then relatively rotated out of synchronism (dashed line, FIG. 4). Should the driver be aware of the situation, he could depress the manual switch 70 to close it, and this could short-circuit the primary line 76 and stop the engine. However, it may be that the driver will be unaware of the situation, or that there would not be time enough for him safely to actuate the manual switch. This safety device establishes that when the throttle moves ahead of the throttle operating member sufficiently, then the contactor 59 will have moved to a position where it will bridge and short-circuit across the two contacts 57 and 58, changing the switching condition, grounding the primary line and killing the ignition. This causes the engine to stop.

Should the oil pump wire be frozen, the throttle lever can return freely and depart from the oil pump operating member. This precludes the danger that the throttle lever might not return to its initial position despite a freezing of the oil pump operating linkage.

The switching means includes two members which rotate relative to one another in such a way that they can be arranged to resist the entry of water or moisture into the switch. This reduces the risk of electrical malfunction. This switch means is also conveniently enclosed in a boot or cover, if desired.

It will be recognized that the location of switch means 55 is not limited to that shown in the aforesaid embodiment. The requirement is merely being opened and closed as a consequence of the presence or absence of the stated difference of the rotational angle between the throttle valve and the throttle operating member (synchronism or lack of it). The presently preferred embodiment and best mode does, however, mount all of the rotational parts on the pivot pin. Persons skilled in the art will recognize that there is provided a system wherein the uncontrolled running of an engine may be prevented by grounding the ignition as the consequence of a sufficient difference in rotational angle between a throttle lever and a throttle operating member, and that should the throttle linkage become immovable for any reason, the uncontrolled running of the vehicle is prevented by the mere return of the throttle lever to its relaxed position.

This invention is not to be limited by the embodiment shown in the drawings and described in the description, which is given by way of example and not of limitation, but only in accordance with the scope of the appended claims.

We claim:

1. A safety device comprising: a pivot means; a lever rotatably supported on said pivot means; first bias means biasing the lever in a first rotational direction, which first bias means can be overcome by exertion of sufficient force on the lever, whereby to rotate the lever in a second, opposite, rotational direction; an operating member rotatably supported on said pivot means, said operating member being movable in said two rotational directions, said operating member being adapted for connection to a spring-biased throttle valve with second bias means that tends to move the operating member in said first direction, and which can be overcome by exertion of a sufficient force on the operating member, whereby to open the throttle valve, said lever and operating member being abutable and independently rotatable on said pivot means, whereby the lever can be rotated in the second direction to abut and rotate the operating member, the said second bias means, when unimpeded, causing the operating member to follow the lever in said first direction, remaining in abutment therewith, the lever being free to continue to rotate independently of the operating member and leave it behind when the latter is restrained; a first switch member and a second switch member interconnected to one another and independently rotatable relative to one another around an axis of rotation; one said switch member being connected to said lever in such a manner that it rotates when the lever rotates, the other said switch member being connected to said operating member in such a manner that it rotates when the operating member rotates; and switching means mounted to both of said first and second switch members whereby to be responsive to the relative rotational orientation of the two switch members, said switching means having a conductive condition in one relative rotational orientation of the two switch members, and a non-conductive condition in another relative rotational position thereof.

2. A device according to claim 1 in which said switch members are rotatably mounted to said pivot means.

3. A safety device according to claim 2 in which said switching means comprises two parts, one of which is carried by each of said switch members.

4. A safety device according to claim 3 in which one of said parts comprises a pair of conductive contacts, and the other of said parts comprises a conductive contactor which, in one condition, connects the contacts and in another condition does not connect them.

5. A safety device according to claim 1 in which said switch members form a closed cavity between them, with the switching means in the cavity, said switch members closely abutting one another in shear relationship.

6. A safety device according to claim 1 in which the pivot means is a pivot pin, and in which the lever, the operating member, and both switch members are spindled onto said pivot pin for coaxial rotation thereon.

7. A safety device according to claim 6 in which the throttle lever is U-shaped to overhang and shield the throttle operating member.

8. A safety device according to claim 6 in which a manual open-closed switch is provided adjacent to the lever, and in which the pivot means and the manual open-closed switch are mounted to the same structure.

9. In combination: a safety device according to claim 1, and ignition means conductively connected to said switching means, whereby to be enabled in the non-conductive switching condition and disabled in the conductive condition.

10. A combination according to claim 9 in which a throttle valve linkage connects the throttle valve to the operating member, said linkage following the position of the throttle valve, but the lever being free to leave the operating member behind in said first direction.

* * * * *